Patented Apr. 5, 1949

2,466,009

UNITED STATES PATENT OFFICE 2,466,009

ANTHRAQUINONE COMPOUNDS CONTAINING A 2,2-DIFLUOROETHYLAMINO GROUP

Joseph B. Dickey, Rochester, N. Y., assignor to Eastman Kodak Company, Rochester, N. Y., a corporation of New Jersey No Drawing. Application March 29, 1946, Serial No. 658,217

1 Claim. (Cl. 260—380)

This invention relates to new anthraquinone compounds and their application to the art of dyeing or coloring.

The anthraquinone compounds of my invention can be represented by the general formula:

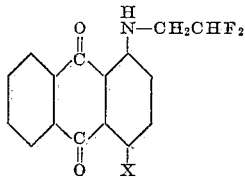

wherein X stands for a member selected from the group consisting of a hydrogen atom, a bromine atom, a chlorine atom, a hydroxy group, an amino group, a 2,2-difluoroethylamino radical, an alkoxyalkylamino group containing 3 to 8, inclusive, carbon atoms and wherein the oxygen linkage is joined to a carbon atom, other than an α-carbon atom, of the grouping immediately preceding it, a hydroxyalkylamino group containing 2 to 5, inclusive, carbon atoms and wherein there is no hydroxy group on the carbon atom which is attached to the nitrogen atom, and a monohydroxyalkoxyalkylamino group containing 4 to 9, inclusive, carbon atoms wherein the hydroxy group is attached to a carbon atom, other than an α-carbon atom, of the alkoxy group furthest removed from the amino group, wherein the —O—$C_nH_{2n}$— and —$C_nH_{2n}$— groupings present in said monohydroxyalkoxyalkylamino group contain at least two but no more than three carbon atoms and wherein the oxygen linkage present is joined to a carbon atom, other than an α-carbon atom, of the grouping immediately preceding it.

It is an object of my invention to provide new anthraquinone compounds. Another object is to provide a satisfactory process for preparing the new anthraquinone compounds of the invention. A further object is to provide colored materials of good fastness properties. A specific object is to provide colored cellulose acetate textile materials of good fastness properties. A still further object is to provide a satisfactory process for coloring nylon and organic derivatives of cellulose textile materials with the new anthraquinone compounds of the invention.

The new anthraquinone compounds of my invention constitute valuable dyes for the coloration of organic derivatives of cellulose and nylon materials, especially textile materials made from these substances. They are particularly adapted for the coloration of cellulose acetate textile materials. The dye compounds of the invention possess good affinity for the aforesaid organic derivatives of cellulose and nylon textile materials, are readily applied thereto and yield dyeings thereon which possess superior gas and light fastness properties.

Orange, reddish-pink, reddish-violet, violet and reddish-blue dyeings are obtained on organic derivatives of cellulose and nylon textile materials. The dyeings obtained are more reddish than those obtained with the corresponding anthraquinone compounds containing an ethylamino group instead of a 2,2-difluoroethylamino group. Thus while 1-hydroxy-4-2,2-difluoroethylaminoanthraquinone dyes cellulose acetate a reddish-violet color 1-hydroxy-4-ethylamino dyes cellulose acetate a bluish-violet color. Further, generally the dyeings obtained on cellulose acetate with the dye compounds of my invention are more light fast and gas fast than the corresponding dyeings obtained on cellulose acetate with the dye compounds wherein there is an ethylamino group instead of a 2,2-difluoroethylamino group.

Illustrative alkylamino groups include, for example, the methylamino group, the ethylamino group, the n-propylamino group, the isopropylamino group, the n-butylamino group, the n-amylamino group and the n-hexylamino group. Illustrative alkoxyalkylamino groups include, for example, the β-methoxyethylamino group, the β-ethoxyethylamino group, the β-(n-propoxy)-ethylamino group, the β-(n-butoxy)-ethylamino group, the γ-methoxy-(n-propyl)-amino group, the β-(β-methoxyethoxy)-ethylamino group

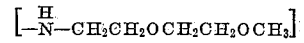

the β-(β-ethoxyethoxy)-ethylamino group, the β[β - (β - methoxyethoxy) - ethoxy] - ethylamino group

the β[β - (β - ethoxyethoxy)-ethoxy]-ethylamino group

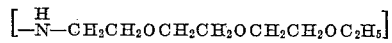

the β-(β-n-butoxyethoxy)-ethylamino group

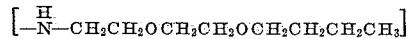

the γ-(γ-methoxypropoxy)-propylamino group

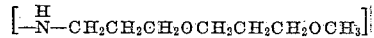

and the β-(β-ethoxypropoxy)-propylamino group

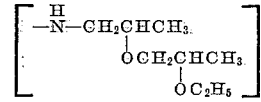

Illustrative of the hydroxyalkylamino groups that can be present in the anthraquinone compounds of my invention may be mentioned, for example, the β-hydroxyethylamino group, the β-hydroxypropylamino group, the γ-hydroxypropylamino group, the 4-hydroxybutylamino group, the 5-hydroxyamylamino group, the β,γ- dihydroxypropylamino group, the 1-methylolethylamino group,

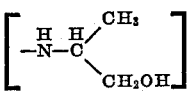

the 1-methylol-n-propylamino group

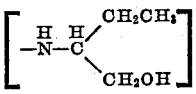

the 3-methylol-2-butylamino group

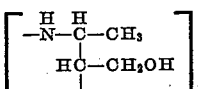

the 3-hydroxy-2-butylamino group

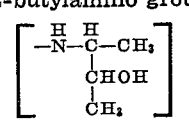

the dimethylolmethylamino group

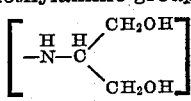

the 1,1-dimethylolethylamino group

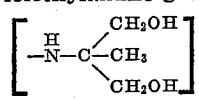

the 1,1-dimethylol-n-propylamino group

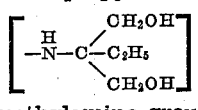

the trimethylolmethylamino group

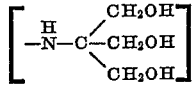

the 2-methylol-2-butylamino group

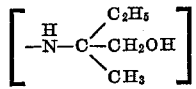

and the 2-ethylol-2-propylamino group

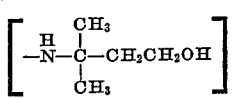

β-(β-hydroxyethoxy)-ethylamino

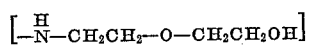

β-[β-(β-hydroxyethoxy)-ethoxy]-ethylamino

γ-(γ-hydroxypropoxy)-propylamino

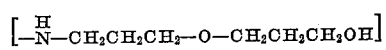

γ-[γ-(γ-hydroxypropoxy) - propoxy] - propylamino

[ H
 —N—CH₂CH₂CH₂—O—CH₂CH₂CH₂—O—CH₂CH₂CH₂OH ]

β-(β-hydroxypropoxy)-propylamino

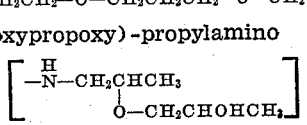

β-(β-hydroxypropyl)-ethylamino

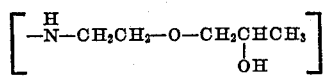

and

β-[β-(β-hydroxypropoxy) - propoxy] - propylamino

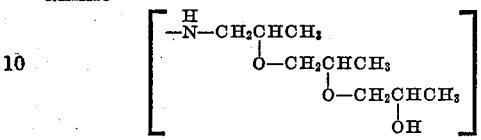

are illustrative of the monohydroxyalkoxyalkylamino groups that can be present in the anthraquinone compounds of my invention.

The compounds of my invention can be prepared in a variety of ways. 1-2,2-difluoroethylaminoanthraquinone can be prepared, for example, by reacting 1-nitroanthraquinone with 2,2-difluoroethylamine in the presence of an inert solvent such as dry pyridine, ethanol or n-butanol. 1-2,2-difluoroethylamino - 4 - aminoanthraquinone can be prepared, for example, by reacting 1-amino-4-nitroanthraquinone with 2,2-difluoroethylamine in the presence of pyridine. 1-2,2-difluoroethylamino-4-bromoanthraquinone can be prepared, for example, by reacting bromine (10% excess) with 1-2,2-difluoroethylaminoanthraquinone in the presence of an inert diluent or solvent such as pyridine, ethanol or n-butanol. The use of pyridine is advantageous. 1 - 2,2 - difluoroethylamino - 4 - chloroanthraquinone can be prepared in a similar manner by reacting chlorine with 1-2,2-difluoroethylaminoanthraquinone. The chlorination reaction can also be carried out with sulfuryl chloride and a catalyst such as ferric chloride in an inert diluent medium such as pyridine.

1-2,2-difluoroethylamino-4-hydroxyanthraquinone can be prepared by reacting leuco quinizarin or a mixture of quinizarin and leuco quinizarin with a slight excess of 2,2-difluoroethylamine over that theoretically required to replace one of the hydroxy groups.

Compounds wherein an alkylamino, alkoxyalkylamino, a hydroxyalkylamino or a monohydroxyalkoxyalkylamino group is present in the 4-position can be prepared by reacting the leuco form of 1-2,2 - difluoroethylamino-4-hydroxyanthraquinone with an alkylamine, an alkoxyalkylamine, a hydroxyalkylamine and a monohydroxyalkoxyalkylamine, respectively. These compounds can also be prepared by reacting a leuco 1-(alkyl, hydroxyalkyl, alkoxyalkyl or hydroxyalkoxyalkyl) - amino - 4 - hydroxyanthraquinone with 2,2-difluoroethylamine. Also mixtures of dyes can be prepared by reacting leuco quinizarin or a mixture of leuco quinizarin and quinizarin with 2,2-difluoroethylamine and one or more amines selected from the group consisting of an alkylamine, an alkoxyalkylamine, a hydroxyalkylamine and a hydroxyalkoxyalkylamine. Where the leuco form of the dye compound is obtained, the leuco dye compound is oxidized to its non-leuco form by treatment with an oxidizing agent such as air, oxygen, sodium perborate, nitrobenzene, hydrogen peroxide or ammonium persulfate, for example. Normally, the condensation reactions referred to in this paragraph are carried out in the presence of an inert diluent, which may also act as a solvent, such as water, pyridine, ethanol, n-propanol and n-butanol.

Anthraquinone compounds containing a 2,2-difluoroethylamino group in both the 1 and 4 positions can be prepared by methods similar to those described above. Thus 1,4-di-2,2-difluoroethylaminoanthraquinone can be prepared by reacting two molecular equivalent weights of 2,2-difluoroethylamine with 1 molecular equivalent weight of leuco quinizarin or an equivalent amount of a mixture of quinizarn and leuco quinizarin and oxidizing any unoxidized dye compound present in the reaction mixture to its non-leuco form.

In those cases where a mixture of quinizarin and leuco quinizarin is used, at least 10% by weight of leuco quinizarin should be present in the mixture.

The following examples in which parts are by weight further illustrate the compounds of my invention and their manner of preparation.

Example 1

2.42 parts of leuco quinizarin, 0.85 part of 2,2-difluoroethylamine and 12.2 parts of n-butyl alcohol were placed in a suitable reaction vessel and refluxed together for 20 hours. The leuco dye formed was oxidized by adding 3 parts of water and 2.31 parts of sodium perborate ($NaBO_3.4H_2O$) and heating for 3 hours. The reaction mixture was then cooled and filtered. 1.85 parts of a black crystalline product, were obtained.

The product obtained as described above was washed thoroughly with hot water and then twice extracted with 32 parts of hot ethyl alcohol (64 parts in all). The residue remaining consisted of 0.75 part of 1,4-di-(2,2-difluoroethylamino)-anthraquinone melting at 230–235° C.

The filtrate from the ethyl alcohol extraction was partially concentrated and then cooled. 1.05 parts of 1-2,2-difluoroethylamino-4-hydroxyanthraquinone was obtained. Upon recrystallization from ethyl alcohol it melted at 130–133° C. The dye compound thus obtained colors cellulose acetate and nylon textile materials reddish-violet shades of excellent fastness to light and gas.

Example 2

2.42 parts of leuco quinizarin, 1.78 parts of 2,2-difluoroethylamine and 12.2 parts of n-butyl alcohol were placed in a suitable reaction vessel and refluxed together for 24 hours. The color of the reaction mixture became deep wine red. The leuco dye formed was oxidized by adding 3 parts of water and 2.31 parts of sodium perborate ($NaBO_3.4H_2O$) and heating for 3 hours. The reaction mixture was poured into 300 parts of warm water with stirring. Stirring was continued until the reaction mixture was cool following which it was filtered. The 1,4-di-(2,2-difluoroethylamino)-anthraquinone obtained was washed well with water and dried. 2.9 parts were obtained. Upon crystallization from n-butyl alcohol the dye melted at 220–225° C. It colors cellulose acetate and nylon textile materials reddish-blue shades of good fastness to light and gas.

An analysis of the product for nitrogen showed the following:

| Theoretical | Found |
|---|---|
| Percent 7.65 | Percent 7.62 |

Example 3

10 parts of 1-nitroanthraquinone in 100 parts of dry pyridine are heated to 100° C. and 4 parts of 2,2-difluoroethylamine are added dropwise. An orange color indicating reaction develops at once and after a short period of heating, preferably with stirring, the reaction is complete. 1-2,2-difluoroethylaminoanthraquinone crystallizes out of the pyridine on cooling and is recovered by filtration. It can be further purified by recrystallization from a solvent such as pyridine, toluene or acetic acid. The dye compound obtained as described dyes cellulose acetate and nylon textile materials orange shades. This compound can also be prepared by substituting an equivalent gram molecular weight of 1-chloroanthraquinone or sodium anthraquinone-1-sulfonate for 1-nitroanthraquinone in the foregoing reaction.

Example 4

13.4 parts of 1-amino-4-nitroanthraquinone are dissolved in 148 parts of dry pyridine and heated on a steam bath. 5.6 parts of 2,2-difluoroethylamine in 250 parts of dry pyridine are then added dropwise with stirring while heating on the steam bath. The reaction mixture immediately turns to a violet color. When no further color change takes place, the reaction mixture is allowed to cool and 1-2,2-difluoroethylamino-4-aminoanthraquinone crystallizes out and is recovered by filtration. The dye compound thus obtained can be purified by recrystallization from a solvent such as pyridine, toluene or acetic acid. It colors cellulose acetate and nylon textile materials violet shades.

Example 5

12 parts of leuco quinizarin are dissolved in 122 parts of n-butyl alcohol and 1.6 parts of methylamine as a 25% water solution are added dropwise under refluxing conditions. Then 4.4 parts of 2,2-difluoroethylamine in 16.2 parts of n-butyl alcohol are added dropwise while maintaining the reaction mixture under refluxing conditions. Refluxing is continued for an additional 10 hours following which the leuco dye compound formed is obtained by passing air into the reaction mixture. If desired, sodium perborate can be used to effect the oxidation. 1-difluoroethylamino-4-methylaminoanthraquinone separates from the reaction mixture and is recovered by filtration. It can be purified by crystallization from a solvent such as pyridine or n-butyl alcohol. It colors cellulose acetate and nylon textile materials violet shades which are of good fastness to light and gas.

By the substitution of an equivalent molecular weight of ethylamine for methylamine in the foregoing example, 1-2,2-difluoroethylamino-4-ethylaminoanthraquinone is obtained. This dye compound similarly colors cellulose acetate and nylon textile materials violet shades which are of good fastness to light and gas.

Example 6

12 parts of leuco quinizarin are dissolved in 122 parts of n-butyl alcohol and 4 parts of 2,2-difluoroethylamine are added thereto and the reaction mixture is heated to refluxing conditions. When no further color change takes place, 3.5 parts of ethanolamine are added dropwise with stirring to the reaction mixture which is maintained under refluxing conditions. The reaction mixture is refluxed, with stirring, for an additional 10 hours and then the leuco dye compound formed is oxidized by passing in air, or if desired, the oxidation can be effected with sodium perborate. 1-2,2-difluoroethylamino-4-$\beta$-hydroxyethylaminoanthraquinone precipitates from the reaction mixture upon cooling and is recovered by filtration. It is purified by recrystallization from pyridine. It colors cellulose acetate and nylon textile materials reddish-blue shades which are of good fastness to light and gas.

*Example 7*

12 parts of leuco quinizarin are dissolved in 122 parts of n-butyl alcohol and 4 parts of 2,2-difluoroethylamine in 16.2 parts of n-butyl alcohol are added dropwise under refluxing conditions. Then 8 parts of β-methoxyethylamine in 16.2 parts of n-butyl alcohol are added dropwise with stirring to the reaction mixture which is maintained under refluxing conditions. Refluxing is continued for an additional 10 hours. The leuco dye compound formed is oxidized and the 1-2,2-difluoroethylamino - 4 - β - methoxyethylaminoanthraquinone which precipitates from the reaction mixture is recovered by filtration, washed with water and dried. It is purified by recrystallization from pyridine. It colors cellulose acetate and nylon textile materials reddish-blue shades which are of good fastness to light and gas. The oxidation reaction referred to above can be carried out by passing air into the reaction mixture or by means of the oxidizing agents specifically mentioned hereinbefore or by any other suitable oxidizing agent.

*Example 8*

12 parts of leuco quinizarin are dissolved in 122 parts of n-butyl alcohol and 4 parts of 2,2-difluoroethylamine in 16.2 parts of n-butyl alcohol are added dropwise under refluxing conditions. Then 4.5 parts of β-(β-hydroxyethoxy)-ethylamine in 16.2 parts of n-butyl alcohol are added dropwise with stirring to the reaction mixture which is maintained under refluxing conditions. Refluxing is continued for an additional ten hours. The leuco dye compound formed is then oxidized by means of sodium perborate and the 1 - 2,2 - difluoroethylamino - 4 - β - (β - hydroxyethoxy) - ethylaminoanthraquinone which precipitates from the reaction mixture is recovered by filtration, washed with water and dried. It is purified by recrystallization from pyridine. It colors cellulose acetate and nylon textile materials reddish-blue shades which are of good fastness to light and gas.

*Example 9*

6 parts of leuco quinizarin, 6 parts of quinizarin, 4 parts of ethylamine and 4.8 parts of 2,2-difluoroethylamine are reacted in 122 parts of n-butyl alcohol at 100° C. with stirring for 15 hours. The reaction mixture is worked up in accordance with the procedure described in Example 8. An intimate mixture of 1,4-diethylaminoanthraquinone, 1,4-di - (2,2 - difluoroethylamino)-anthraquinone and 1-2,2-difluoroethylamino-4-ethylaminoanthraquinone is obtained.

Frequently, dye mixtures having improved dyeing characteristics can be obtained in the manner just indicated. As is apparent, a wide variety of amines can be used. Thus mixtures of methylamine and 2,2-difluoroethylamine, n-propylamine and 2,2-difluoroethylamine, ethanolamine and 2,2-difluoroethylamine, β-ethoxyethylamine and 2,2-difluoroethylamine, methylamine, ethylamine, and 2,2-difluoroethylamine and 2,2-difluoroethylamine and β-(β-hydroxyethoxy)-ethylamine, for example, can be employed.

*Example 10*

57.4 parts of 1-2,2-difluoroethylaminoanthraquinone are dissolved in 590 parts of pyridine and heated on a water bath to 60° C. while stirring. Then while maintaining this temperature, 33.2 parts of bromine are added to the reaction mixture over a 1½ hour period. The reaction mixture is then slowly heated to 90–95° C., maintained at this temperature for two hours and the 1 - difluoroethylamino - 4 - bromoanthraquinone which is formed is recovered by filtration, washed with 100 parts of pyridine and dried. The dye compound thus obtained colors cellulose acetate and nylon textile materials orange shades.

The following compounds further illustrate the compounds included within the scope of my invention. They can be prepared by the methods described hereinbefore.

1-2,2-difluoroethylamino - 4 - chloroanthraquinone,

1 - 2,2 - difluoroethylamino - 4 - n - propylaminoanthraquinone,

1 - 2,2 - difluoroethylamino-4-isopropylaminoanthraquinone, 1-2,2 - difluoroethylamino - 4 - n - butylaminoanthraquinone, 1 - 2,2 - difluoroethylamino - 4 - n - amylaminoanthraquinone, 1 - 2,2 - difluoroethylamino - 4 - n - hexylaminoanthraquinone, 1 - 2,2-difluoroethylamino - 4 - β-hydroxypropylaminoanthraquinone, 1-2,2 - difluoroethylamino - 4 - γ-hydroxypropylaminoanthraquinone, 1 - 2,2 - difluoroethylamino - 4 - ω - hydroxyamylaminoanthraquinone, 1-2,2-difluoroethylamino - 4 - β,γ - dihydroxypropylaminoanthraquinone, 1 - 2,2 - difluoroethylamino - 4 - (1 - methylolethyl)-aminoanthraquinone 1 - 2,2 - difluoroethylamino - 4 - dimethylolmethylaminoanthraquinone 1 - 2,2 - difluoroethylamino - 4 - trimethylolmethylaminoanthraquinone 1 - 2,2 - difluoroethylamino-4-(3-methylol - 2 - butyl) - aminoanthraquinone 1 - 2,2 - difluoroethylamino-4-(1,1-dimethylolethyl)-aminoanthraquinone 1-2,2-difluoroethylamino - 4 - (1,1 - dimethylol-n-propyl)-aminoanthraquinone 1 - 2,2-difluoroethylamino - 4 - (1 - methylol - n-propyl) - aminoanthraquinone 1-2,2-difluoroethylamino - 4 - (3 - hydroxy - 2 - butyl)-aminoanthraquine 1 - 2,2 - difluoroethylamino - 4 - (2 - methylol-2-butyl)-aminoanthraquinone 1 - 2,2 - difluoroethylamino - 4 - (2 - ethylol-2-propyl)-aminoanthraquinone 1 - 2,2 - difluoroethylamino - 4 - β - ethoxyethylaminoanthraquinone 1 - 2,2 - difluoroethylamino - 4 - β - (n - butoxyethyl) aminoanthraquinone 1 - 2,2-difluoroethylamino - 4 - β-(n-propoxyethyl) aminoanthraquinone 1 - 2,2 - difluoroethylamino - 4 - γ - methoxy - (n-propyl) - aminoanthraquinone 1-2,2-difluoroethylamino - 4 - β - (β - methoxyethoxy)-ethylaminoanthraquinone 1 - 2,2 - difluoroethylamino - 4 - β - [β - (β - ethoxyethoxy) - ethoxy] - ethylaminoanthraquinone 1 - 2,2 - difluoroethylamino - 4 - β-(β-n-butoxyethoxy) - ethylaminoanthraquinone 1 - 2,2 - difluoroethylamino - 4 - γ - (γ - methoxypropoxy) - propylaminoanthraquinone 1 - 2,2 - difluoroethylamino - 4 - β - (β - ethoxypropoxy) - propylaminoanthraquinone 1 - 2,2 - difluoroethylamino - 4 - β - [β - (β - hydroxyethoxy)-ethoxy] - ethylaminoanthraquinone 1 - 2,2 - difluoroethylamino - 4 - β - (β - hydroxypropoxy)-ethylaminoanthraquinone 1-2,2-difluoroethylamino - 4 - β - (β - hydroxypropoxy) - propylaminoanthraquinone 1 - 2,2 - difluoroethylamino -4-β-[β-(β-hydroxypropoxy) - propoxy] - propylaminoanthraquinone 1 - 2,2 - difluoroethylamino - 4 - γ - (γ - hydroxypropoxy) - propylaminoanthraquinone 1 - 2,2 - difluoroethylamino - 4 - γ - [γ - (γ - hydroxypropyoxy) - propoxy] - propylaminoanthraquinone In order that my invention may be entirely clear, it is here noted that the alkylamino, alkoxyalkylamino, hydroxyalkylamino and monohydroxyalkoxyalkylamino groups are conveniently introduced into the anthraquinone nucleus by means of the corresponding primary amine in accordance with the procedure described hereinbefore. To illustrate, the trimethylolmethylamino and β-hydroxyethylamino groups, for example, can be introduced by means of trimethylolmethylamine and ethanolamine, respectively.

While pyridine, n-butyl alcohol, ethyl alcohol, toluene and acetic acid have been disclosed as solvents which can be used to purify the compounds of my invention, chloroform and nitrobenzene can also be used. The purification can be effected by adding the compound to be purified to the solvent, heating to effect solution of the compound and then cooling to effect precipitation of the compound. Alternately, the compound can be added to the heated solvent. As the methods of purification are well known to those skilled in the art to which this invention is directed no further discussion is believed necessary.

β-(β-hydroxyethoxy)ethylamine, β-[β-(β-hydroxyethoxy)-ethoxy]-ethylamine, β-(β-hydroxypropoxy) - propylamine, β - [β-(β-hydroxypropoxy) -propoxy]-propylamine, γ-(γ-hydroxypropoxy)-propylamine, γ-(γ-methoxypropoxy)-propylamine, γ-(γ-ethoxypropoxy)-propylamine and β-(β-methoxypropoxy)-propylamine which are amines used in the preparation of the anthraquinone compounds of my invention can be prepared as described in my U. S. Patent 2,357,176 issued August 29, 1944. γ-[γ-(γ-hydroxypropoxy)-propoxy]-propylamine can be prepared by reacting

HOCH₂CH₂CH₂—O—CH₂CH₂CH₂—O—CH₂CH₂CH₂OH with ammonia in the presence of Raney nickel in accordance with the procedure described in my U. S. Patent 2,357,176.

While the dye compounds of my invention have been described more particularly in connection with the coloration of cellulose acetate and nylon textile materials it is to be noted that they are useful for the coloration of the other materials named herein and that they yield about the same colors on these materials as they do on cellulose acetate and nylon.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose.

The anthraquinone dye compounds of my invention may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 60–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 0.1–2% by weight of dye to material is employed although any desired proportions can be used.

Suitable dispersing agents together with the amounts that may be employed are disclosed in McNally and Dickey U. S. Patent 2,115,030, issued April 26, 1938. The process disclosed in this patent for the dyeing of cellulose acetate can be used in applying the dyes of the present invention to organic derivatives of cellulose and nylon textile materials.

I claim:

The anthraquinone compound having the formula:

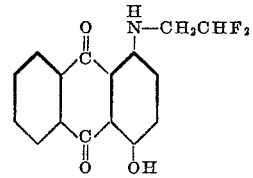

JOSEPH B. DICKEY.

REFERENCES CITED

The following references are of record in the file of this patent:

UNITED STATES PATENTS

| Number | Name | Date |
|---|---|---|
| 2,085,736 | Calcott et al. | July 6, 1937 |
| 2,112,258 | Wilden | Mar. 29, 1938 |
| 2,174,182 | Schlichenmaier et al. | Sept. 26, 1939 |
| 2,333,402 | Wuertz et al. | Nov. 2, 1943 |
| 2,359,381 | Perkins et al. | Oct. 3, 1944 |

OTHER REFERENCES

Gilman, ed., "Organic Chemistry," (2nd ed., 1943), vol. I, pages 956, 960, 963.